Patented July 30, 1940

2,209,744

UNITED STATES PATENT OFFICE 2,209,744

JAPANESE BEETLE INSECTICIDE

Charles J. Austin, Elkton, Md.

No Drawing. Application February 24, 1938,
Serial No. 192,427

3 Claims. (Cl. 167—19)

My invention relates generally to insecticides and particularly to an insecticide for destroying the Japanese beetle and similar insect pests, and an important object of my invention is to provide an effective, serviceable, and easily handled insecticide of this character.

Another object of my invention is to provide an insecticide of the character indicated in the form of a spray which can be diluted with water for use on the more delicate plants.

Other important objects of my invention will be apparent from a reading of the following description and examples given for illustrative purposes wherein I have set forth preferred embodiments of my invention in both the product and method of preparing the same.

The stock fluid from which the insecticide of liquid form is obtained by dilution with water to the desired strength contains the resultant of a preparation of substantially:

Rosin _____ pounds__ 10
Sodium hydroxide _____ do____ 1
Fish-oil soap (hard soda whale oil
  soap _____ do____ 1
Water _____ gallons__ 30
Corrosive sublimate _____ pound__ 1
Nicotine sulphate _____ ounces__ 1

The stock fluid is prepared by putting the first three ingredients and 10 gallons of water into a container and boiling the same for a period of from three to four hours, or until the same becomes the color of black coffee. This resultant is then removed from the heat source and thereto is added the corrosive sublimate dissolved in the 20 gallons of water, and the one ounce of nicotine sulphate. The foregoing operations produce a 30-gallon quantity of the stock fluid.

For spraying fruit trees, hardy shrubs, grass and weeds, the stock fluid is diluted with water in a ratio of one gallon of stock fluid to two gallons of water.

For spraying beans and other similarly delicate plants a solution of three to four gallons of water and one gallon of stock fluid is used.

I find that the most effective times for spraying are, in the early morning before the Japanese beetles start their flight, and in the afternoon when the beetles settle down for the night.

It is also effective to spray the ground around the plants, especially after the beetles fall therefrom as a result of the spraying of the plants, since this kills such beetles as have not taken in the full toxic effect of the spray on the plants and eliminates removal of the fallen beetles and their eventual return to plant destructive activity.

Although I have described and set forth herein preferred embodiments of the product and the method of preparing the product in accordance with the present invention it is to be definitely understood that I do not desire to limit the application of the invention thereto, but any change or changes may be made in the materials and in the manner of assembling the same within the spirit of the invention and the scope of the subjoined claims.

Having described the invention, what is claimed as new is:

1. A Japanese beetle insecticide comprising the reaction product of substantially 10 pounds of rosin, 1 pound of sodium hydroxide, 1 pound of hard soda fish oil soap, 1 pound of corrosive sublimate, 1 ounce of nicotine sulphate, and 30 gallons of water.

2. A method of making a Japanese beetle insecticide, said method consisting in mixing together substantially 10 pounds of rosin, 1 pound of sodium hydroxide, 1 pound of hard soda fish oil soap, and 10 gallons of water and boiling the same until a resultant is obtained having substantially the color of black coffee, then removing the resultant from the heat and thereto adding the product of a mixture of substantially 1 pound of corrosive sublimate and substantially 20 gallons of water, and adding substantially 1 ounce of nicotine sulphate.

3. A Japanese beetle insecticidal spray, said spray consisting of the product of a boiled mixture of substantially 10 pounds of rosin, 1 pound of sodium hydroxide, 1 pound of fish oil soap, and water, and an aqueous solution comprising substantially 1 pound of corrosive sublimate, and 1 ounce of nicotine sulphate.

CHARLES J. AUSTIN.